(12) United States Patent
Saito

(10) Patent No.: US 6,430,055 B2
(45) Date of Patent: Aug. 6, 2002

(54) ELECTRICAL CONNECTION BOX

(75) Inventor: Yukitaka Saito, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/764,437

(22) Filed: Jan. 19, 2001

(30) Foreign Application Priority Data

Jan. 20, 2000 (JP) .......................................... 2000-011743

(51) Int. Cl.$^7$ ................................................ H05K 5/00
(52) U.S. Cl. ........................ 361/752; 361/753; 361/823; 439/76.2
(58) Field of Search ................................. 361/752, 753, 361/826–829, 823; 439/76.27, 75, 78, 83, 949

(56) References Cited

U.S. PATENT DOCUMENTS 5,011,417 A * 4/1991 Matsumoto et al. .......... 439/76
5,822,189 A    10/1998 Isshiki
6,168,456 B1 * 1/2001 Saka et al. ................... 439/404
6,224,397 B1 * 5/2001 Nakamura ................. 439/76.2
6,283,769 B1 * 9/2001 Asao et al. ................. 439/76.2

FOREIGN PATENT DOCUMENTS

EP        0 782 216 A2 * 12/1996

* cited by examiner

*Primary Examiner*—Kamond Cuneo
*Assistant Examiner*—Tuan Dinh
(74) *Attorney, Agent, or Firm*—Oliff & Berridge, PLC

(57) ABSTRACT

An electrical connection box has a first casing part in which is mounted a bus bar laminate, and a second casing part in which a wiring substrate is accommodated. To achieve accurate alignment of projecting tabs of the bus bar laminate with connectors of the wiring substrate during connection of the casing parts, the first casing part has projections and the wiring substrate has recesses which mutually engage before the tabs enter the connectors. Direct alignment is achieved, increasing reliability of the product.

9 Claims, 8 Drawing Sheets

ELECTRICAL CONNECTION BOX

BACKGROUND OF THE INVENTION

1. Field of Invention

The invention relates to an electric connection box suitable to be mounted in, for example, a vehicle such as an automobile.

2. Description of Related Art

One form of an electric connection box provides a case composed of a casing part for a bus bar laminate and casing part for a wiring substrate. The bus bar laminate is formed by alternatingly laminating bus bars and insulation layers. A substrate connector making electrical connection with the bus bars is mounted on the wiring substrate. In assembly, the bus bars are received in the substrate casing part when the two casing parts are united, and the bus bars are connected with the substrate connector. It is required that the two casing parts are accurately positioned before combination so that the connection position of the bus bars coincides with the substrate connector. Accordingly, an electric connection box in which the two casing parts are joined when accurately positioned has been proposed. The electric connection box aligns the casing parts by bringing the wiring substrate casing part in contact with guide pieces formed on the upper face of the laminate casing part. However, in this box, bus bars are aligned with the substrate connector indirectly by positioning of the wiring substrate through its casing part. Therefore, there have been problems that deviation of the connection position of the bus bars with the connector occurs, and good connection cannot be achieved because of dimension tolerance of the respective casing parts, assembly error of the wiring substrate in its casing part, and the like.

U.S. Pat. No. 5,822,189 illustrates an electrical connection box, for automotive use, which also seeks to achieve good connection of a bus bar laminate and connectors of a wiring board. A lower casing contains a bus bar laminate having upwardly projecting tab terminals. Into this casing a circuit board is fitted, which carries on its edges connector housings which receive the tab terminals. In one embodiment, the connector housings are positioned by guide ribs of the lower casing, which also serve to ensure correct location of the connector housings on the circuit board. After fitting of the circuit board in this manner, an upper casing is fitted on the lower casing, pressing on the circuit board.

SUMMARY OF THE INVENTION

An object of the invention is to provide an electric connection box capable of satisfactorily connecting a bus bar laminate with a connector.

According to the invention, there is provided an electrical connection box including a first casing part and a second casing part connectable with the first casing part. A bus bar laminate, having at least one bus bar and at least one insulation layer laminated together, is mounted in the first casing part and has projecting terminals. A wiring substrate is mounted in the second casing part and has connectors carried thereon, adapted to engage and make connection to the projecting terminals of the bus bar laminate when the casing parts are connected. The first casing part and the wiring substrate have portions constituting mutually engageable guides which, during connection of the casing parts, directly establish mutual alignment of the first casing part and the wiring substrate before the connectors engage the projecting terminals.

In the invention, when the first casing part with the bus bar laminate is combined with the second casing part with the wiring substrate, the wiring substrate is directly positioned against the laminate casing part by the positioning procedure performed by the guides. The positioning is carried out before the tab terminals of the bus bars are inserted in the connectors of the wiring substrate. Accordingly, it is assured that the connection position of the bus bars coincides with the connectors without being influenced by dimensional tolerance or the like of the first casing part. Therefore, good connection between the bus bars and the connectors can be achieved.

Preferably, the mutually engageable guides include at least one guide projection on one of the first casing part and the wiring substrate, and at least one guide recess in the other of the first casing part and the wiring substrate. The first casing part preferably has a substrate-receiving recess bounded by a surrounding wall which receives the wiring substrate when the casing parts are connected together, the guide projection is a protrusion on the surrounding wall projecting inwardly to said substrate-receiving recess, and the guide recess is a notch in a peripheral region of the wiring substrate.

To support and locate the terminals of the bus bar laminate, preferably the first casing part has a portion overlying the bus bar laminate and directly engaging the projecting terminals so as to determine the position of the projecting terminals relative to said first casing part.

Preferably, each of the first casing part and the wiring substrate has a pair of the portions constituting mutually engageable guides, located respectively at opposite sides of the electrical connection box.

Typically the wiring substrate is a planar board carrying wiring and a plurality of electrical components.

BRIEF DESCRIPTION OF THE DRAWINGS

Embodiments of the invention will now be described by way of a non-limitative example, with reference to the accompanying drawings, in which.

DESCRIPTION OF THE PREFERRED EMBODIMENTS

An electric connection box 11 for an automobile embodying the invention is shown in FIGS. 1–8.

Figure 1:
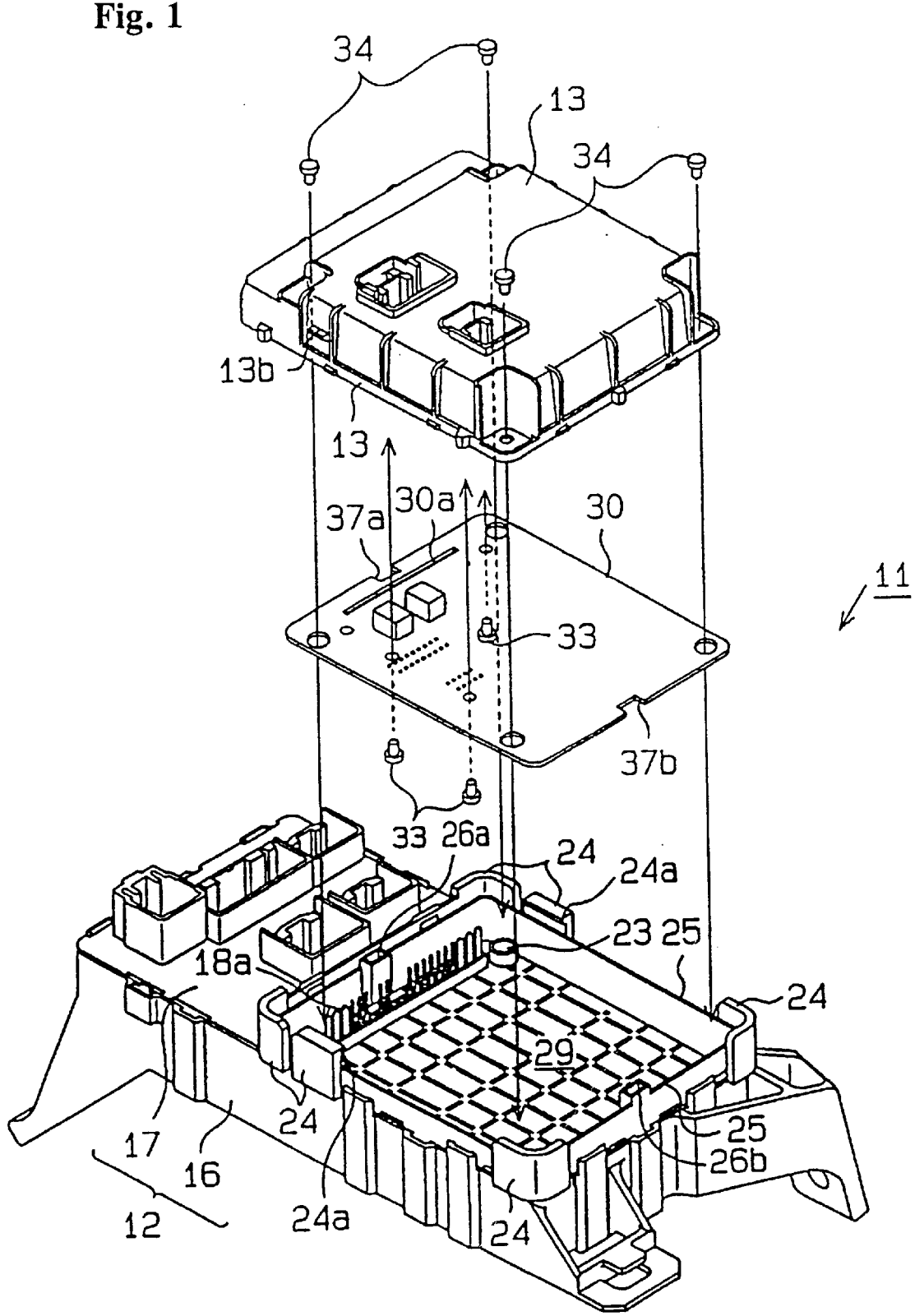
FIG. 1 is an exploded perspective view of an electrical connection box embodying the invention.
Figure 2:
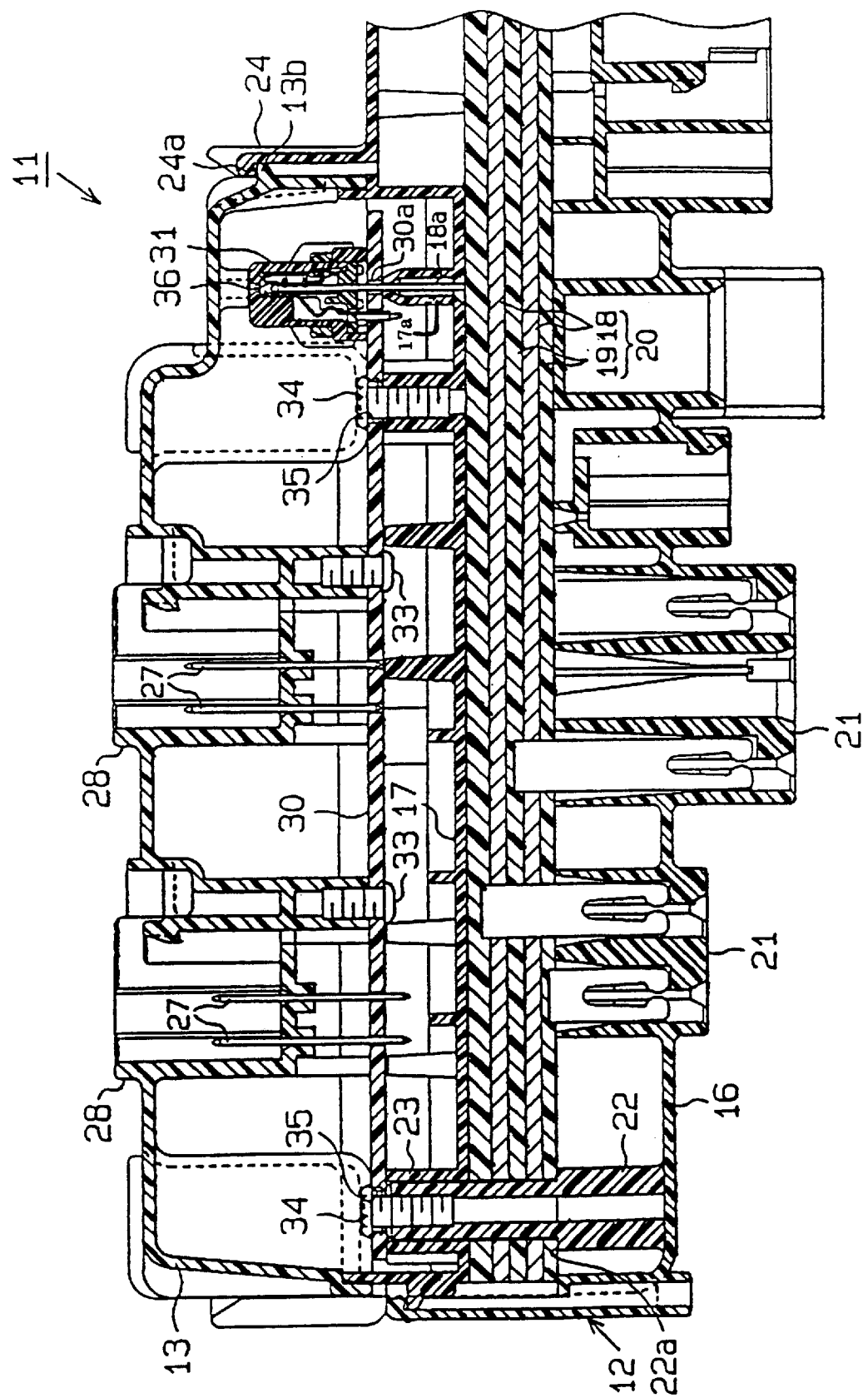
FIG. 2 is a partial sectional view of the electrical connection box of FIG. 1.

As shown in FIGS. 1 and 2, the box 11, typically arranged in the interior space of an automobile, has a first casing part for housing a bus bar laminate, here called a laminate case 12, made by molding of a suitable synthetic resin, and a second casing part for housing a wiring substrate, here called a substrate case 13, also made by molding of suitable synthetic resin and detachably mounted on the upper face of the laminate case 12. The laminate case 12 is composed of a lower case part 16 and an upper case part 17 which are detachably joined. An upper opening of the lower case part 16 is occupied by the upper case part 17.

In the laminate case 12, a bus bar laminate 20 obtained by alternatingly laminating bus bars 18 made of a metal and insulation plates 19 made of a synthetic resin is accommodated. Bus terminals 18a formed on the bus bars 18 penetrate the upper case part 17 and protrude outward from the inside of the laminate case 12. Structures 21 for receiving exterior connectors protrude at the lower face of the lower case part 16. The laminate 20 is supported on the inside end faces of the respective structures 21.

As the figures show, the upper case part 17 has upstanding sleeve-like projections 17a which directly engage and support the tab terminals 18a.

From the bottom face of the lower case 16, internally screw-threaded tubular fixing parts 22 penetrate upwardly through the laminate 20. The upper end part of each fixing part 22 is inserted in a corresponding sleeve part 23 formed on the upper face of the upper case part 17. Steps 22a on the exterior of the fixing parts 22 support the laminate 20, in addition to the structures 21.

As shown best in FIGS. 3–7, guide walls 24 stand up on the upper face of the upper case part 17, and assist in positioning the substrate case 13, when the laminate case 12 and substrate case 13 are joined. Hooking claws 24a are formed on the upper inside faces of the guide walls 24. A recess 29 to receive a wiring substrate is defined on the upper face of the upper case part 17 by the approximately rectangular plan wall 25 inside the guide walls 24.

Two guide projections 26a and 26b may be integrally formed (molded) with the wall 25 at opposite sides of the case 12 and project slightly higher than the upper end of the wall 25. The projecting guide parts 26a and 26b oppose each other and are hollow inside to reduce the occurrence of mold sink on their surfaces in molding.

In the substrate case 13, connector structures 28 (see FIG. 2) for a wire harness having terminals 27 inside are integrally formed on the upper part of the case. The wiring substrate 30 is a planar board having electrical wiring on its surface and carrying electrical components. The wiring substrate 30 installed and fixed by screws 33 on the substrate case 13, and nearly completely closes the lower opening 13a (see FIG. 3). Through apertures 35 (see FIG. 2) in the substrate 30, screws 34 are inserted into the fixing parts 22 of the laminate case 12 fixing the laminate case 12 and the substrate 13 together. Hooking projections 13b are formed at places corresponding to the hooking claws 24a, on the outside face of the substrate case 13.

To make connection with the bus bars, connectors 31 are carried on the wiring substrate 30. For example, one of the connectors 31 is shown in FIGS. 2–8. Connecting terminals 36 connected to the wiring substrate 30 are provided in the connector 31. The tab terminals 18a make connection with the connecting terminals 36 through holes 30a in the wiring substrate 30, when the cases 12 and 13 are joined.

Figure 3:
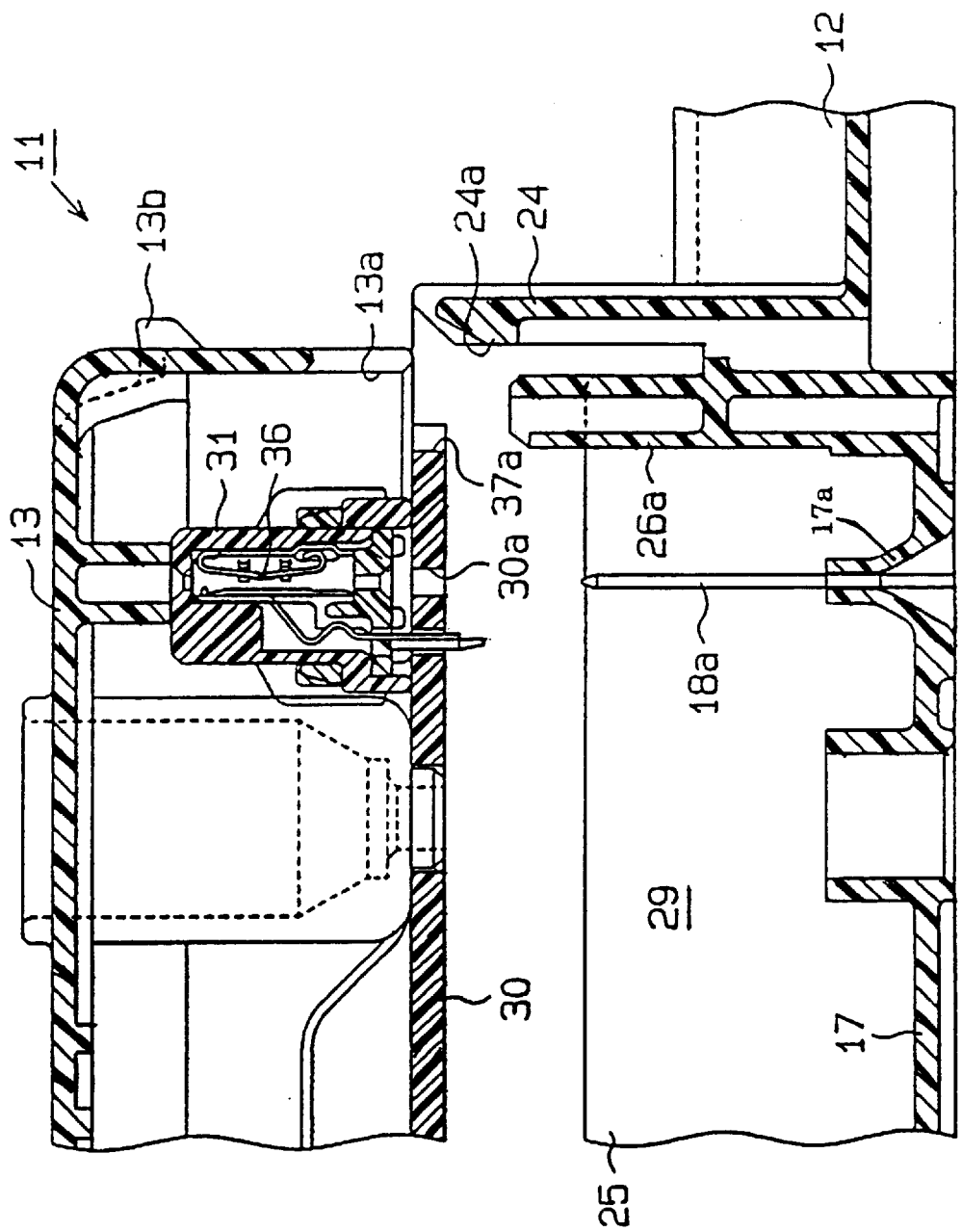
FIGS. 3–7 are respective-partial sectional views of the box of FIG. 1 in successive stages during the joining of the two casing parts.

As shown in FIGS. 1 and 3, two notches 37a and 37b acting as guide recesses are formed on opposite ends of the wiring substrate 30, to cooperate with the guide projections 26a and 26b. When the cases 12 and 13 are joined, there is only slight clearance between the guide projections 26a and 26b and the notches 37a and 37b, respectively.

Further, the engagement of the guide projections 26a and 26b and the notches 37a and 37b is designed to take place before the engagement of the tab terminals 18a with the connecting terminals 36, when the cases 12 and 13 are combined. More specifically, the engagement of the guides 37a and 37b and 26a and 26b occurs before the tab terminal 18a is inserted in the insertion hole 30a and the connector 31. For this purpose, the guide projections 26a and 26b stand higher than the tab terminals 18a, in the direction of mutual approach of the cases 12 and 13 during connection.

Figure 4:
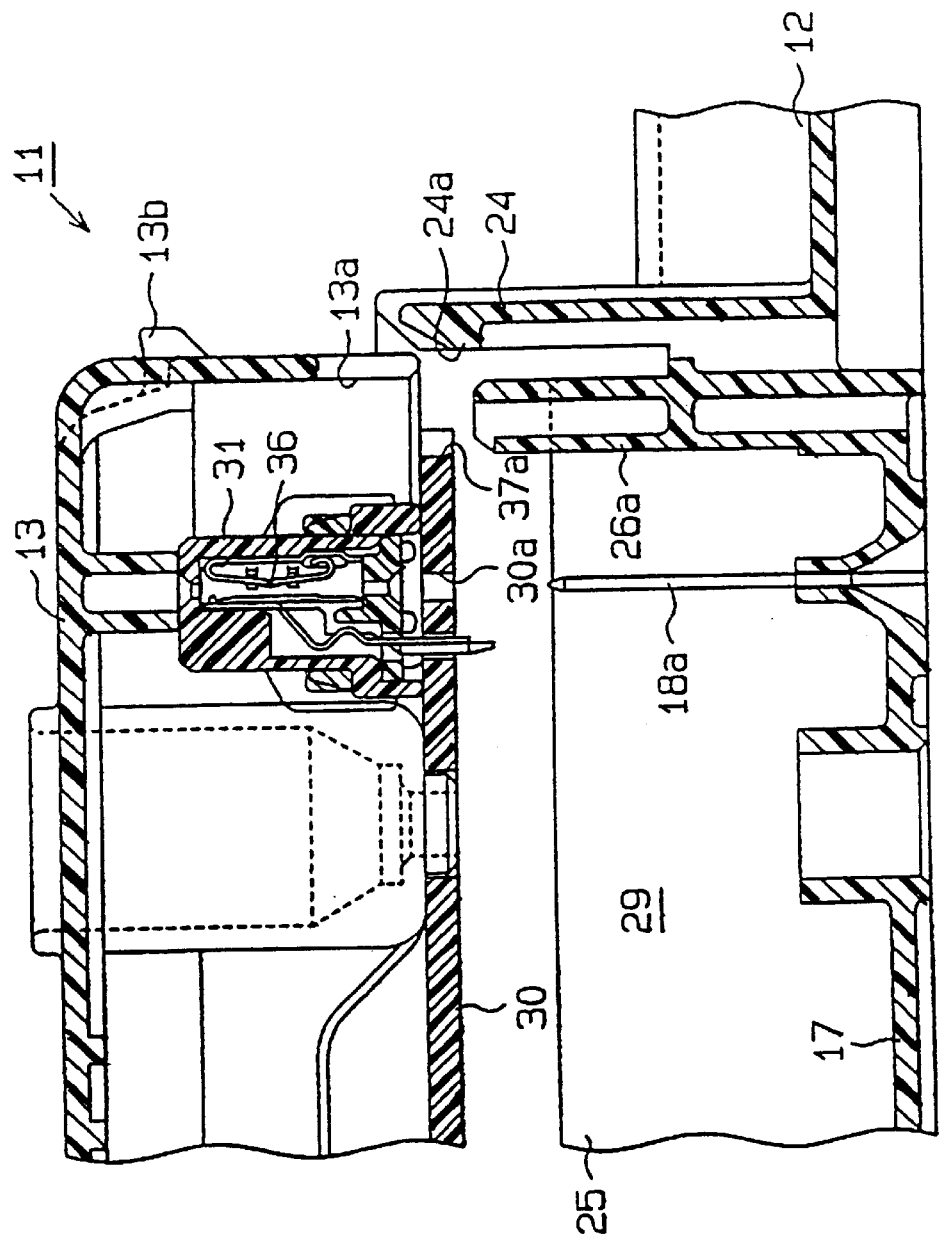
Figure 5:
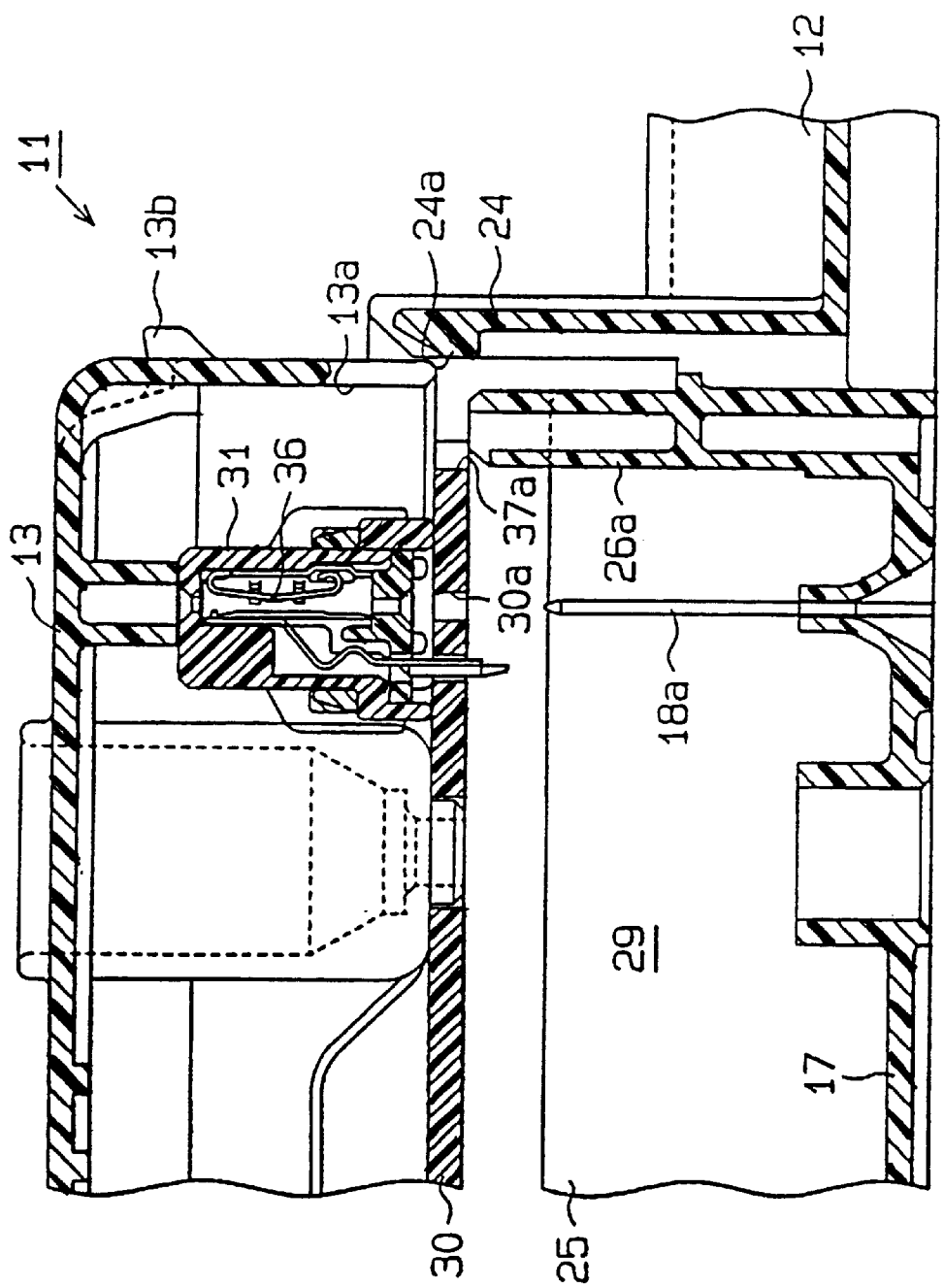
Figure 6:
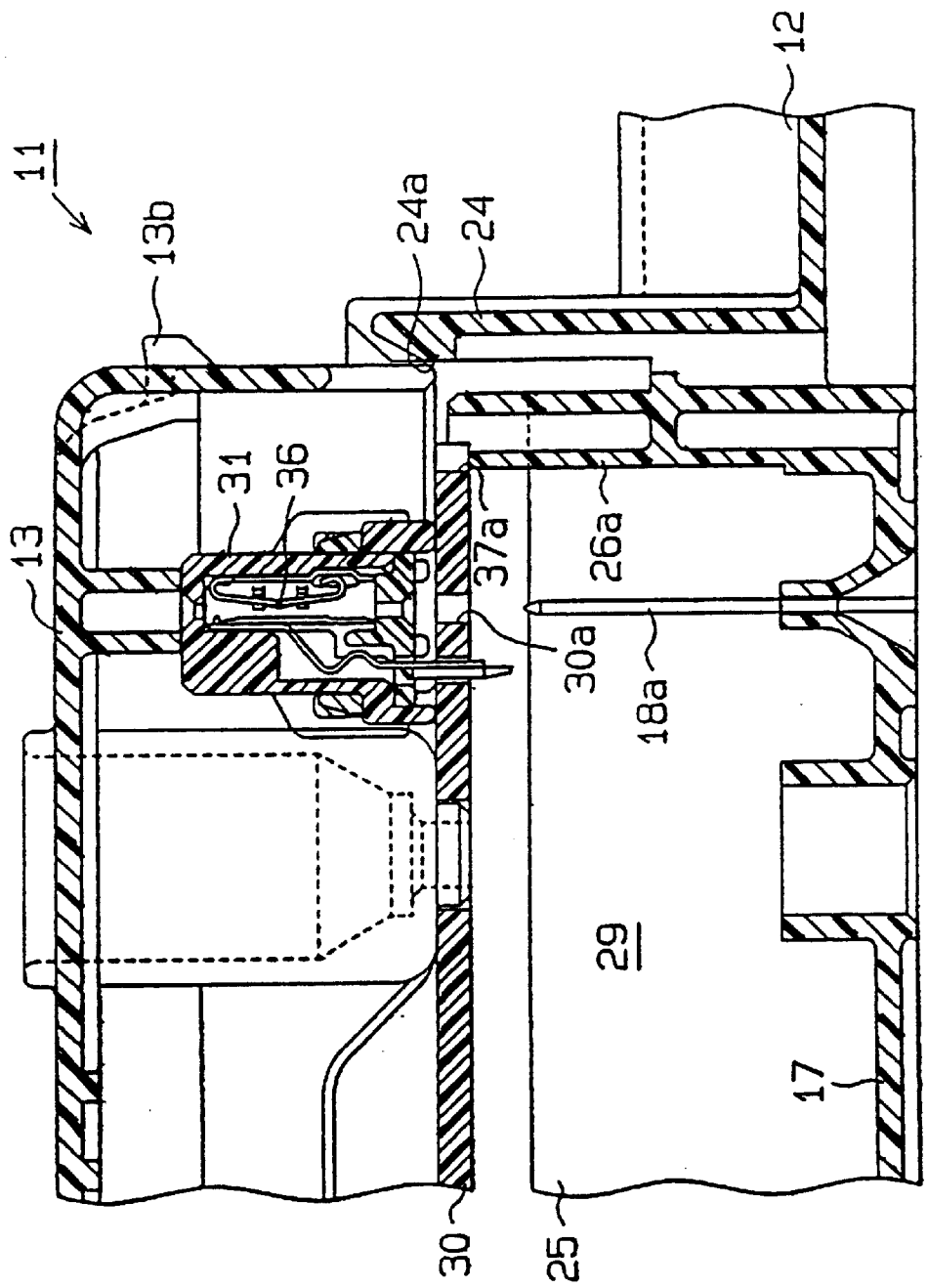

The assembly of the electrical connection box 11 is as follows:

As shown in FIG. 3, the recess 2a of the upper case part 17 is confronted with the lower opening 13a of the substrate case 13. As shown in FIG. 4, the laminate case 12 is approached to the substrate case 13. Then, as shown in FIG. 5, a rim part of the substrate case 13 is brought in contact with the inside face of the guide walls 24, and the positions of the respective notches 37a and 37b formed on the wiring substrate 30 are matched with the respective positions of the guide projections 26a and 26b provided at the edge of the recess 29. As shown in FIG. 6, subsequently, the respective notches 37a and 37b engage with the respective guide projections 26a and 26b. The wiring substrate 30 is thus directly aligned to the laminate case 12. The correct position of the tab terminals 18a of the bus bars 18 with respect to the connecting terminals 36 of the connector 31 is achieved. As the figures show, the substrate 30 and the case 12 are aligned before the tab terminals 18a enter the apertures 30a.

Figure 7:
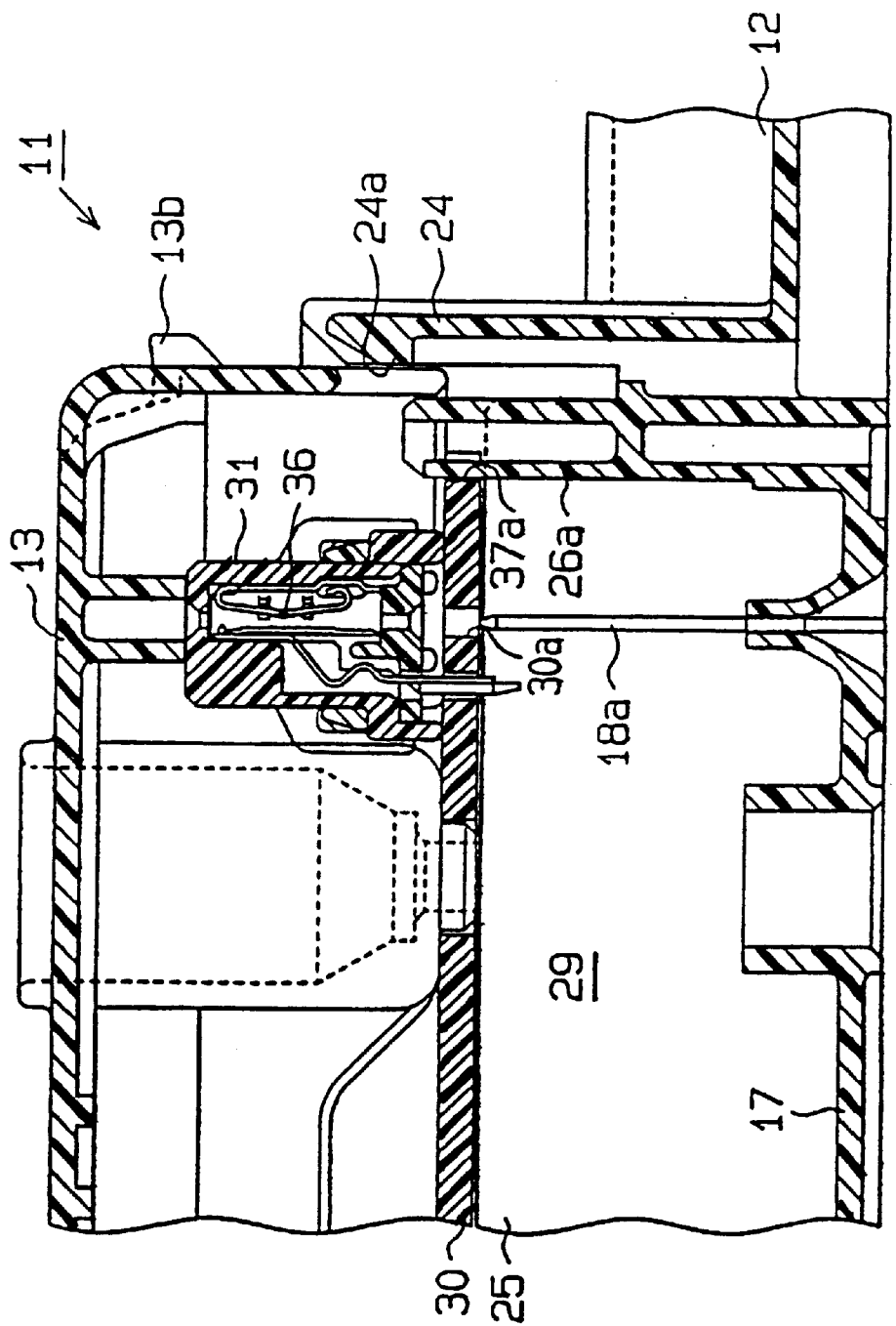
Figure 8:
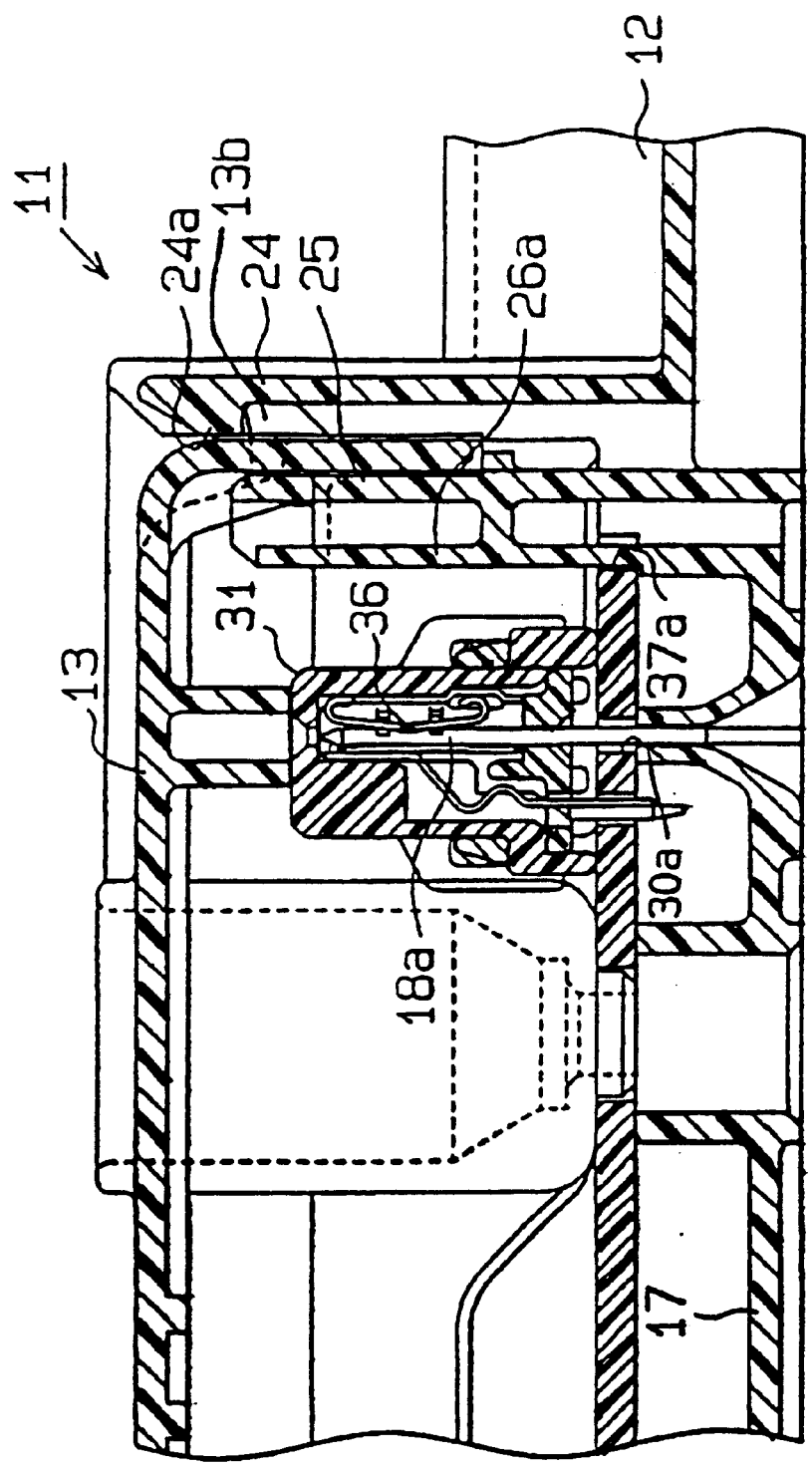
FIG. 8 is a partial sectional view of the box when the joining of the casing parts is completed.

Then, as shown in FIG. 7, the wiring substrate 30 is received in the recess 29 while the notches 37a and 37b slide along the two guide projections 26a and 26b. Further, as shown in FIG. 8, the tab terminals 18a of the bus bars 18 are inserted in the connectors 31 through the insertion holes 30a. At the same time, the hooking claws 24a provided on the guide walls 24 are hooked on the hooking projections 13b of the case 13, to lock the cases 12 and 13 together. Then, as shown in FIGS. 1 and 2, the screws 34 are passed through holes 35, and engaged with the threaded parts 27.

The following advantages can be obtained with this embodiment.

(1) The wiring substrate 30 is aligned relative to the laminate case 12 before the tab terminals 18a formed on the bus bars 18 are inserted in the connectors 31, by directly positioning the wiring substrate 30 against the laminate case 12. Accordingly, the correct connection position of the bus terminals 18a with respect to the connecting terminal 36 can be achieved without being influenced by dimension tolerance of the laminate case or the substrate case, installation aberration of the wiring substrate 30 or the like. Therefore, a good connection between the bus bars 18 and the connector 31 can be achieved, and the reliability of the electric connection box 11 can be improved.

(2) The guide projections 26a and 26b are formed on the wall 25 provided on the laminate case 12. The notches 37a and 37b are formed on the wiring substrate 30. With these parts having a concave and convex relationship, the positioning of the wiring substrate 30 with respect to the case 12 can be easily carried out.

(3) The notches 37a and 37b are formed on the rim of the wiring substrate 30, so that restrictions on electric circuits can be made less in comparison with a case of forming aligning parts at a central part of the wiring substrate 30, and the degree of freedom of design can be enhanced.

(4) The guide projections 26a and 26b are integrally formed on the inside face of the wall 25 bounding the recess 29, so that the strength of the wall 25 can be improved. As the guide projections 26a and 26b are hollow, surface sink marks can be avoided. Therefore, the molding accuracy of the guide projections 26a and 26b is enhanced.

(5) As the guide projections 26a and 26b and the notches 37a and 37b are both provided in plural numbers, and are opposed to each other at opposite sides of the cases 12 and 13, the positioning accuracy of the wiring substrate 30 against the case 12 can be more enhanced.

Modified embodiments are described below:

The respective numbers of the guide projections 26a and 26b and the notches 37a and 37b were described as two, but may be changed to one, three or more.

In the above embodiment, the guide projections 26a and 26b were provided on the case 12, and the notches 37a and 37b on the wiring substrate 30. This relation may be inverted. Namely, the notches may be on the case 12, and the guide projections may be on the wiring substrate 30.

In the above embodiment, the positioning of the wiring substrate 30 with respect to the case 12 was carried out by concave and convex parts. Alternatively, this positioning may be achieved by holes in the wiring substrate 30, and protrusions on the bottom face of the recess 29 engaging these holes.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. An electrical connection box comprising:

a first casing part;

a second casing part connectable with the first casing part;

a bus bar laminate having at least one bus bar and at least one insulation layer laminated together, mounted in said first casing part and having projecting terminals; and a wiring substrate directly mounted in said second casing part and carrying connectors adapted to engage and make connection to said projecting terminals of said bus bar laminate when said first and second casing parts are connected, wherein at least one portion of said first casing part and at least one portion of said wiring substrate constitute respectively mutually engageable guides which, during connection of said first and second casing parts, directly establish mutual contact of said first casing part and said wiring substrate before said connectors engage said projecting terminals.

2. An electrical connection box according to claim 1, wherein said mutually engageable guides comprise at least one guide projection on one of said first casing part and said wiring substrate, and at least one guide recess in the other of said first casing part and said wiring substrate.

3. An electrical connection box according to claim 2, wherein said first casing part has a substrate-receiving recess, bounded by a surrounding wall, which receives said wiring substrate when said first and second casing parts are connected together, said guide projection being a protrusion on said surrounding wall projecting inwardly to said substrate-receiving recess, and said guide recess being a notch in a peripheral region of said wiring substrate.

4. An electrical connection box according to claim 3, wherein said guide projection is unitary with said surrounding wall.

5. An electrical connection box according to claim 1, wherein said first casing part has a portion overlying said bus bar laminate, directly engaging said projecting terminals and determining a position of said projecting terminals relative to said first casing part.

6. An electrical connection box according to claim 1, wherein said projecting terminals of said bus bar laminate and said guide of said first casing part are upstanding towards said second casing part in the direction of mutual approach of said first and second casing parts during connection thereof, said guide of said first casing part standing up higher than said projecting terminals so as to engage said wiring substrate before said connectors engage said projecting terminals during the connection of the casing parts.

7. An electrical connection box according to claim 1, wherein each of said first casing part and said wiring substrate has a pair of said portions constituting mutually engageable guides, located respectively at opposite sides of the electrical connection box.

8. An electrical connection box according to claim 1, wherein said wiring substrate is a planar board carrying wiring and a plurality of electrical components.

9. A vehicle having an electrical connection box according to claim 1.

* * * * *